US 8,879,529 B2

(12) United States Patent
Mariblanca Nieves et al.

(10) Patent No.: US 8,879,529 B2
(45) Date of Patent: *Nov. 4, 2014

(54) APPARATUS AND METHOD FOR SELECTING A VISITED NETWORK

(75) Inventors: David Mariblanca Nieves, Madrid (ES); Juan Antonio Sanchez Herrero, Madrid (ES); Antonio Márquez, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 298 days.

This patent is subject to a terminal disclaimer.

(21) Appl. No.: 13/401,415

(22) Filed: Feb. 21, 2012

(65) Prior Publication Data

US 2012/0149366 A1    Jun. 14, 2012

Related U.S. Application Data

(63) Continuation of application No. 11/916,797, filed as application No. PCT/EP2005/006280 on Jun. 11, 2005, now Pat. No. 8,155,092.

(51) Int. Cl.
*H04W 4/00* (2009.01)
*H04W 8/06* (2009.01)

(52) U.S. Cl.
CPC .................................... *H04W 8/065* (2013.01)
USPC ...................... 370/338; 370/310.2; 455/435.1

(58) Field of Classification Search
USPC .............................. 370/310.2, 338; 455/435.1
See application file for complete search history.

(56) References Cited

U.S. PATENT DOCUMENTS

| | | | |
|---|---|---|---|
| 6,564,055 B1 * | 5/2003 | Hronek | 455/433 |
| 7,072,651 B2 * | 7/2006 | Jiang et al. | 455/432.1 |
| 7,551,926 B2 * | 6/2009 | Rune | 455/435.1 |
| 8,155,092 B2 * | 4/2012 | Mariblanca Nieves et al. | 370/338 |
| 2002/0173307 A1 | 11/2002 | Salmivalli et al. | |
| 2004/0066756 A1 | 4/2004 | Ahmavaara et al. | |
| 2005/0037755 A1 | 2/2005 | Hind et al. | |
| 2006/0262752 A1 | 11/2006 | Moore et al. | |
| 2007/0287419 A1 | 12/2007 | Wang | |

FOREIGN PATENT DOCUMENTS

| | | |
|---|---|---|
| JP | 2005-086471 A | 3/2005 |
| WO | WO 01/54435 A1 | 7/2001 |
| WO | WO 2004/147564 A1 | 2/2004 |

(Continued)

OTHER PUBLICATIONS

"Universal Mobile Telecommunications System (UMTS); Requirements on 3GPP system to Wireless Local Area network (WLAN) interworking (3GPP TS 22.234 version 6.2.0 Release 6) ETSI TS 122 234" ETSI Standards, European Telecommunications Standards Institute, Sophia-Antipo, FR, vol. 3-SA1, No. V620, Sep. 2004.

(Continued)

*Primary Examiner* — Phuc Tran

(57) ABSTRACT

The present invention is aimed to provide a mechanism whereby a roaming user can select a visited network allowed for roaming by the home network operator among a plurality of visited networks accessible through an access network. Therefore, the present invention provides a new method, a new roaming device likely embedded in another network entity and enhanced user equipment whereby the home network, upon a user equipment indication, may submit towards the user equipment a list of allowed or preferred visited networks as well as selection criteria for selecting one visited network from the list.

25 Claims, 8 Drawing Sheets

(56) References Cited

FOREIGN PATENT DOCUMENTS

WO    WO 2004/020554  A1    3/2004
WO    WO 2004/047476  A1    6/2004
WO    WO 2004/077752  A1    9/2004

OTHER PUBLICATIONS

3GPP. $3^{rd}$ Generation Partnership Project; Technical Specification Group Services and System Aspects; 3GPP System to Wireless Local Area Network (WLAN) Interworking; System Description (Release 6). 3GPP TS 23.234 v6.4.0 (Mar. 2005).

3GPP. $3^{rd}$ Generation Partnership Project; Technical Specification Group Core Network; Non-Access-Stratum (NAS) Function related to Mobile Station (MS) in Idle Mode (Release 6). 3GPP TS 23.122 v6.4.0 (Mar. 2005).

3GPP. $3^{rd}$ Generation Partnership Project; Technical Specification Group Services and System Aspects; General packet Radio Service (GPRS); Service Description; Stage 2 (Release 5). 3GPP TS 23.060 v5.9.0 (Sep. 2004).

* cited by examiner

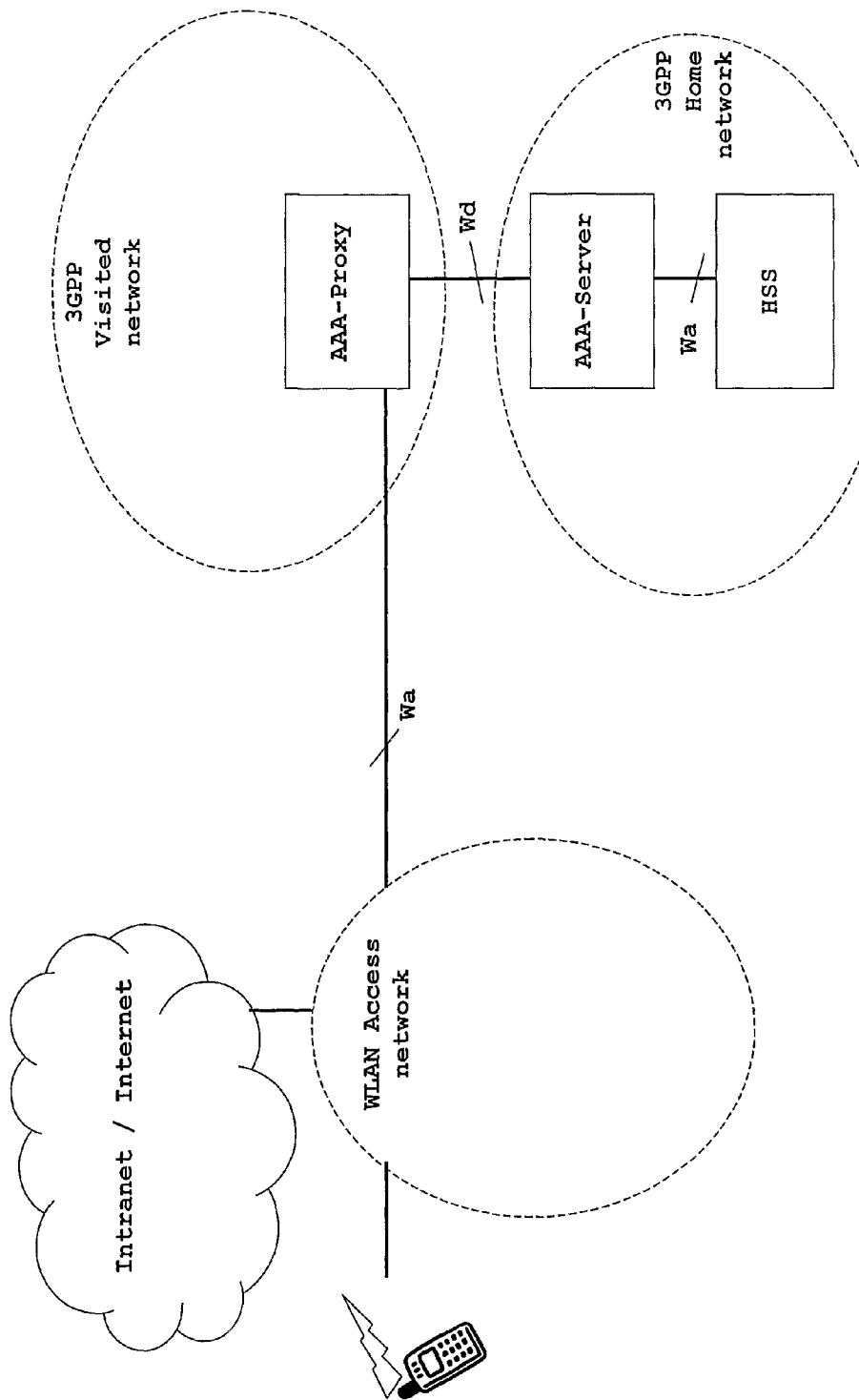
FIG.-1-
State of Art

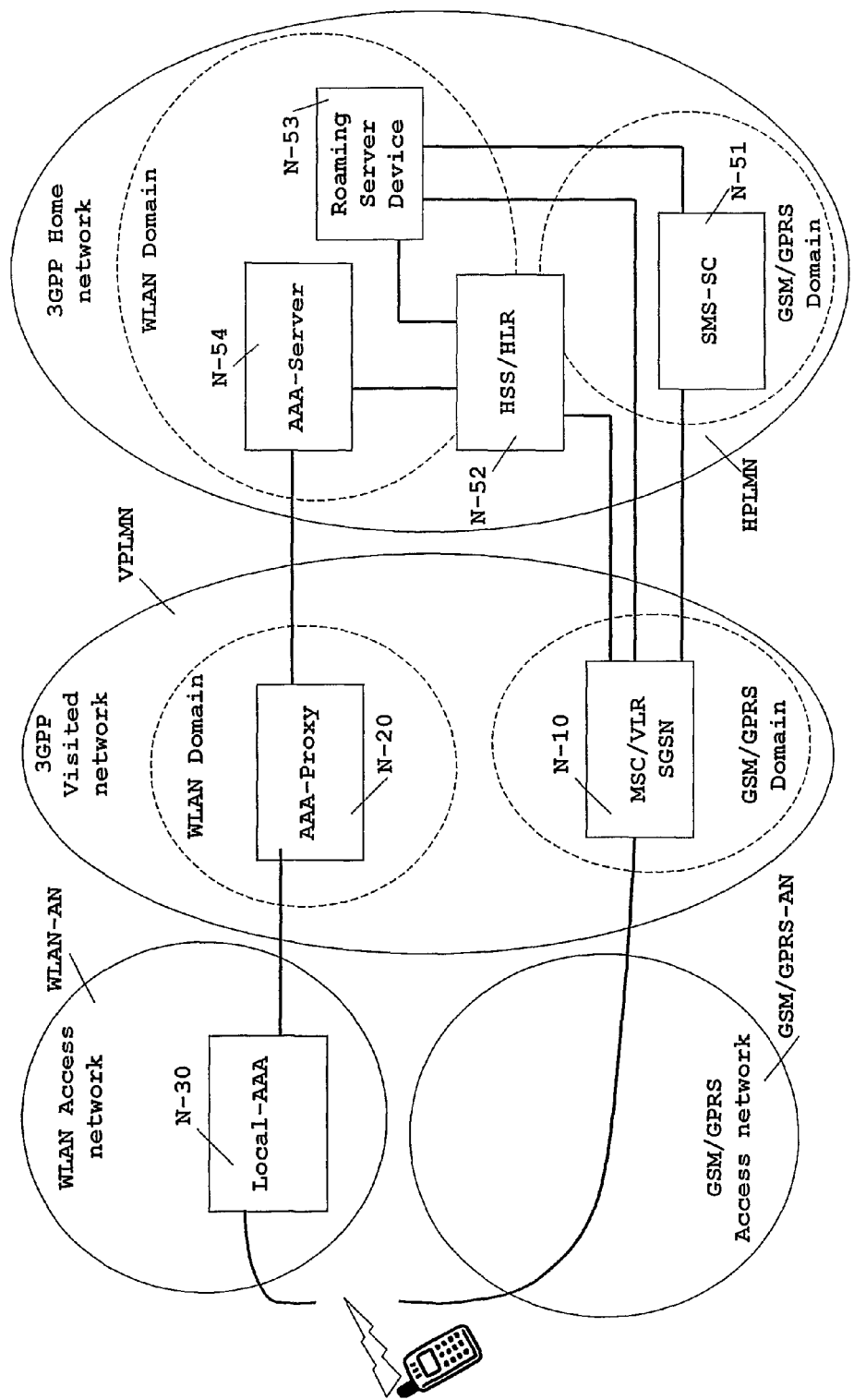
FIG.-2-

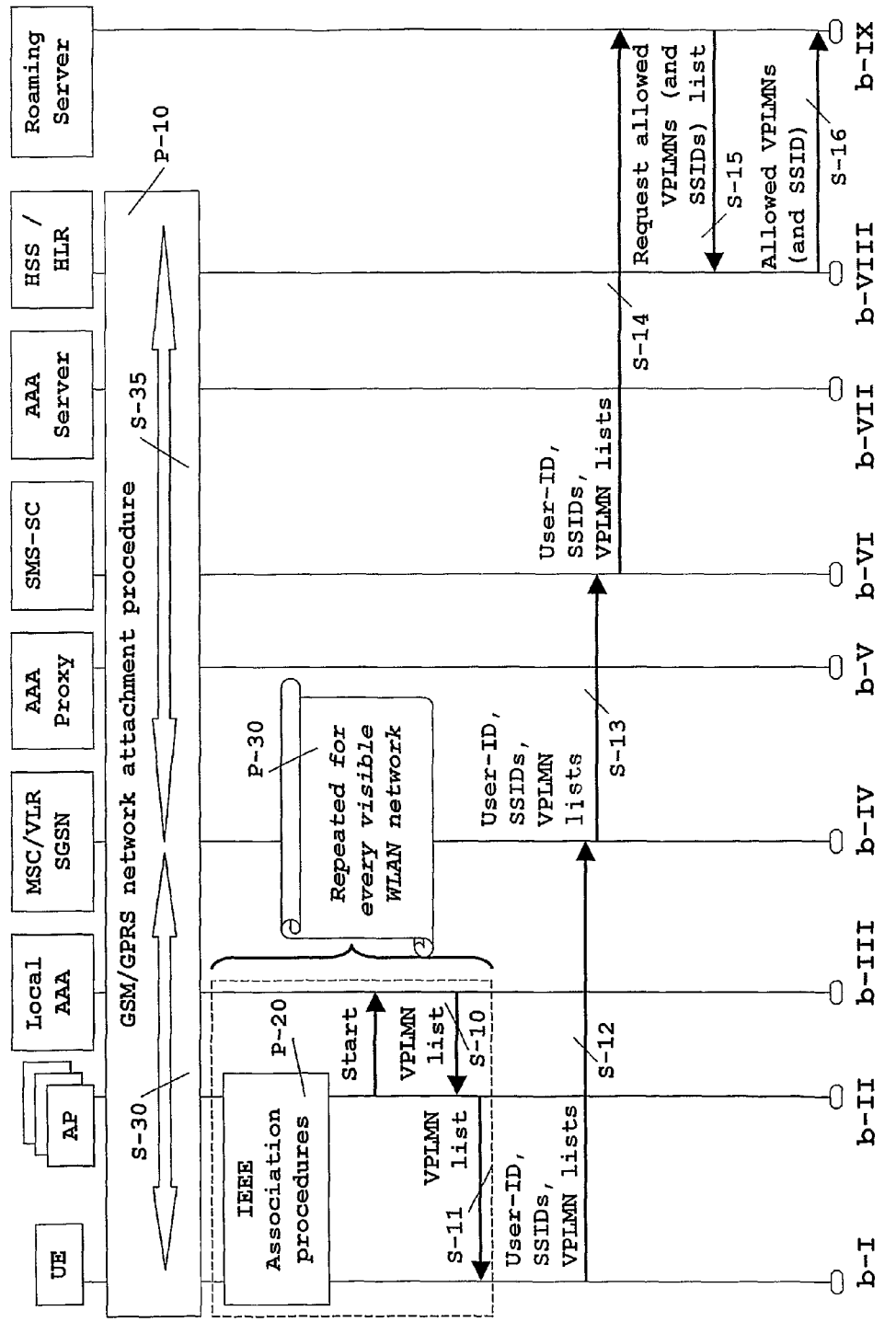
FIG.-3A-

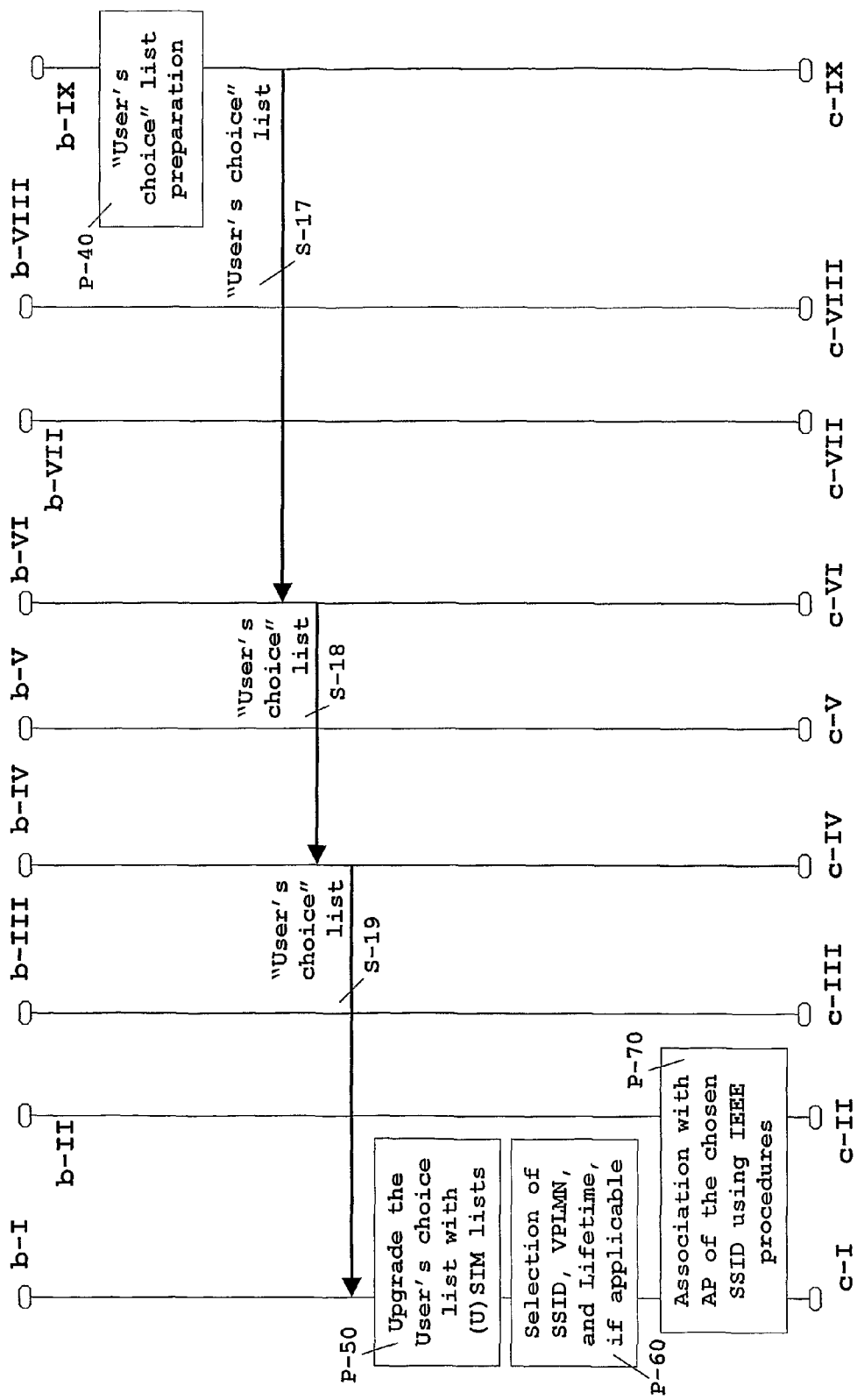
FIG.-3B-

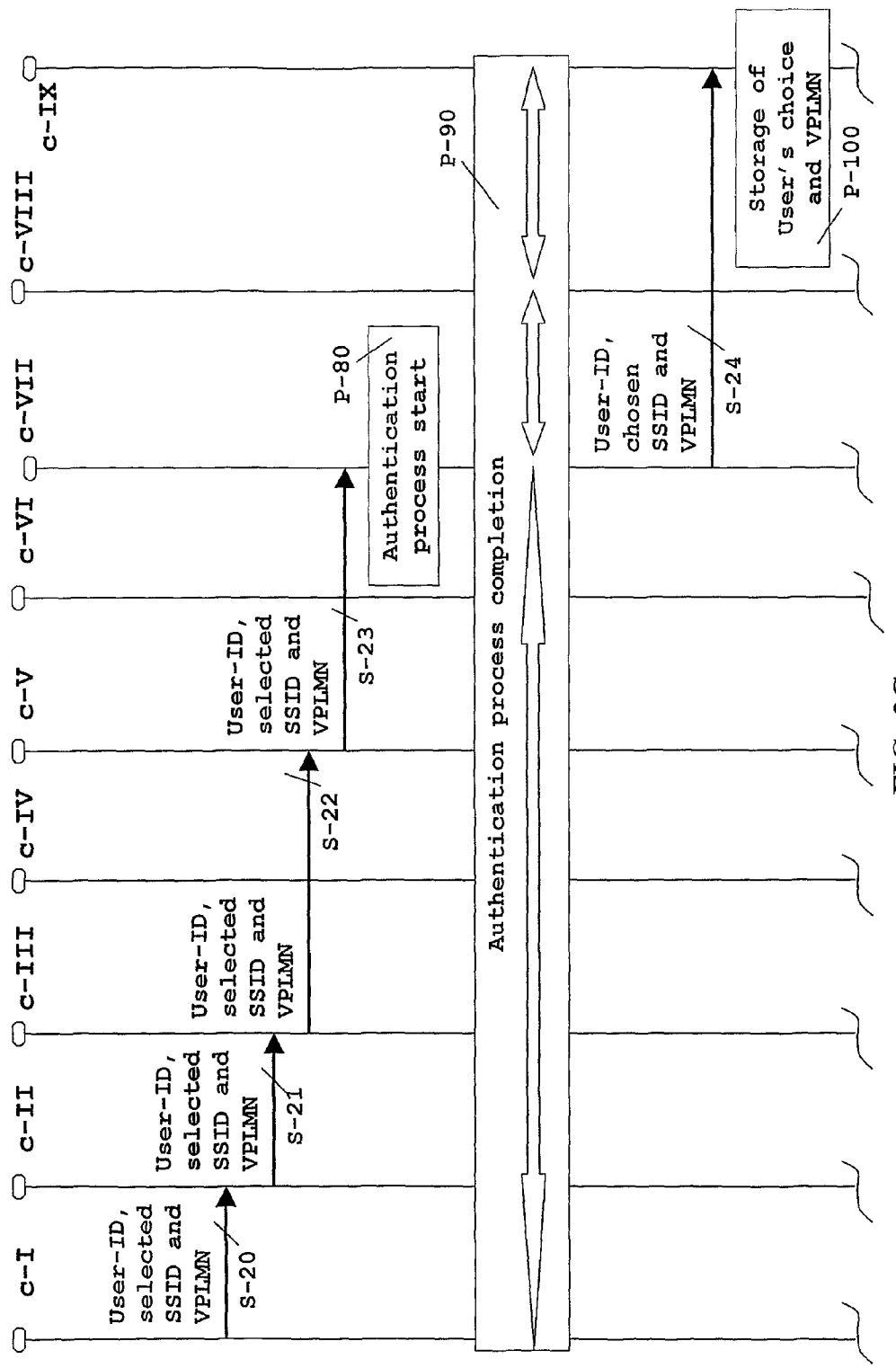
FIG.-3C-

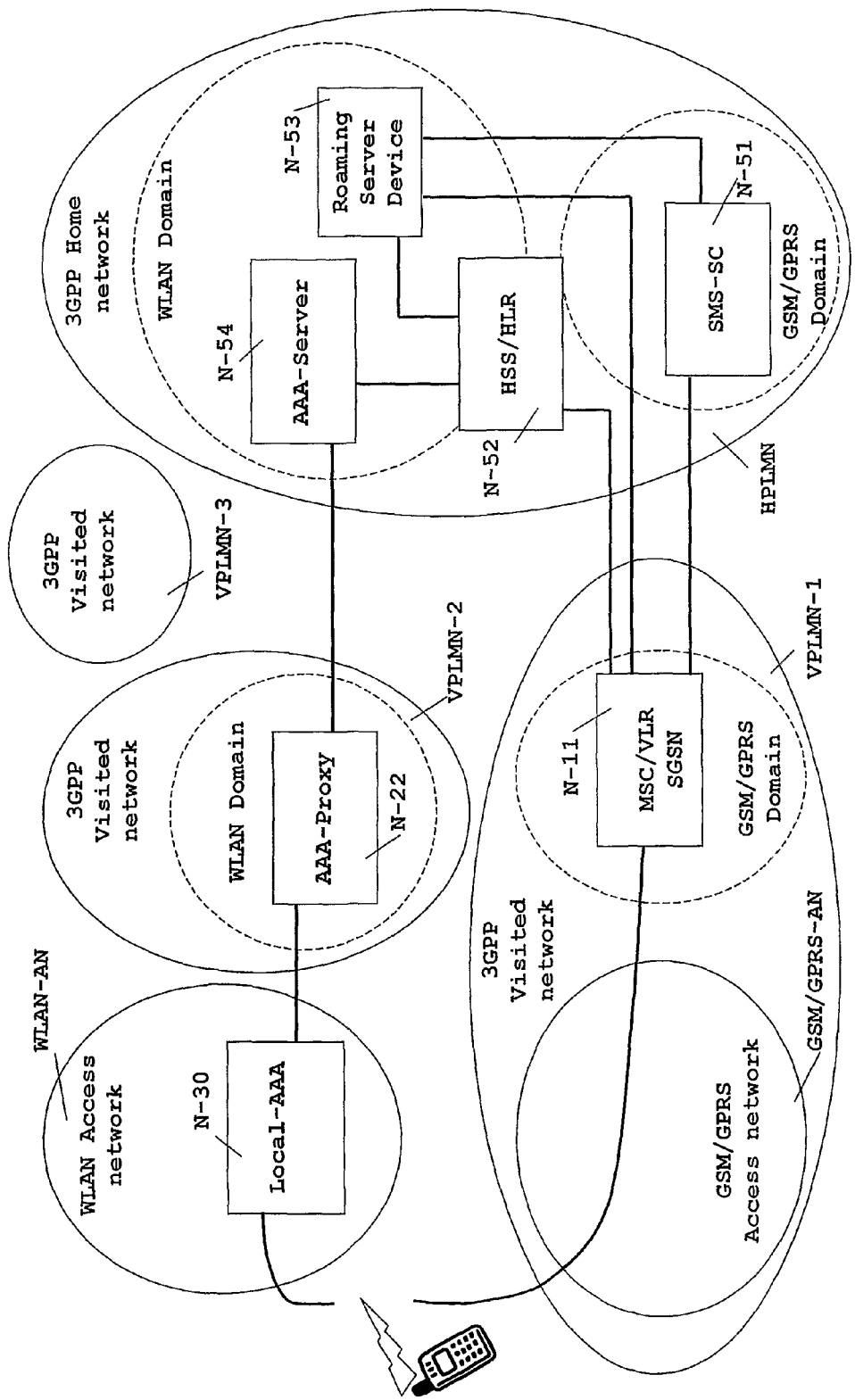
FIG.-4-

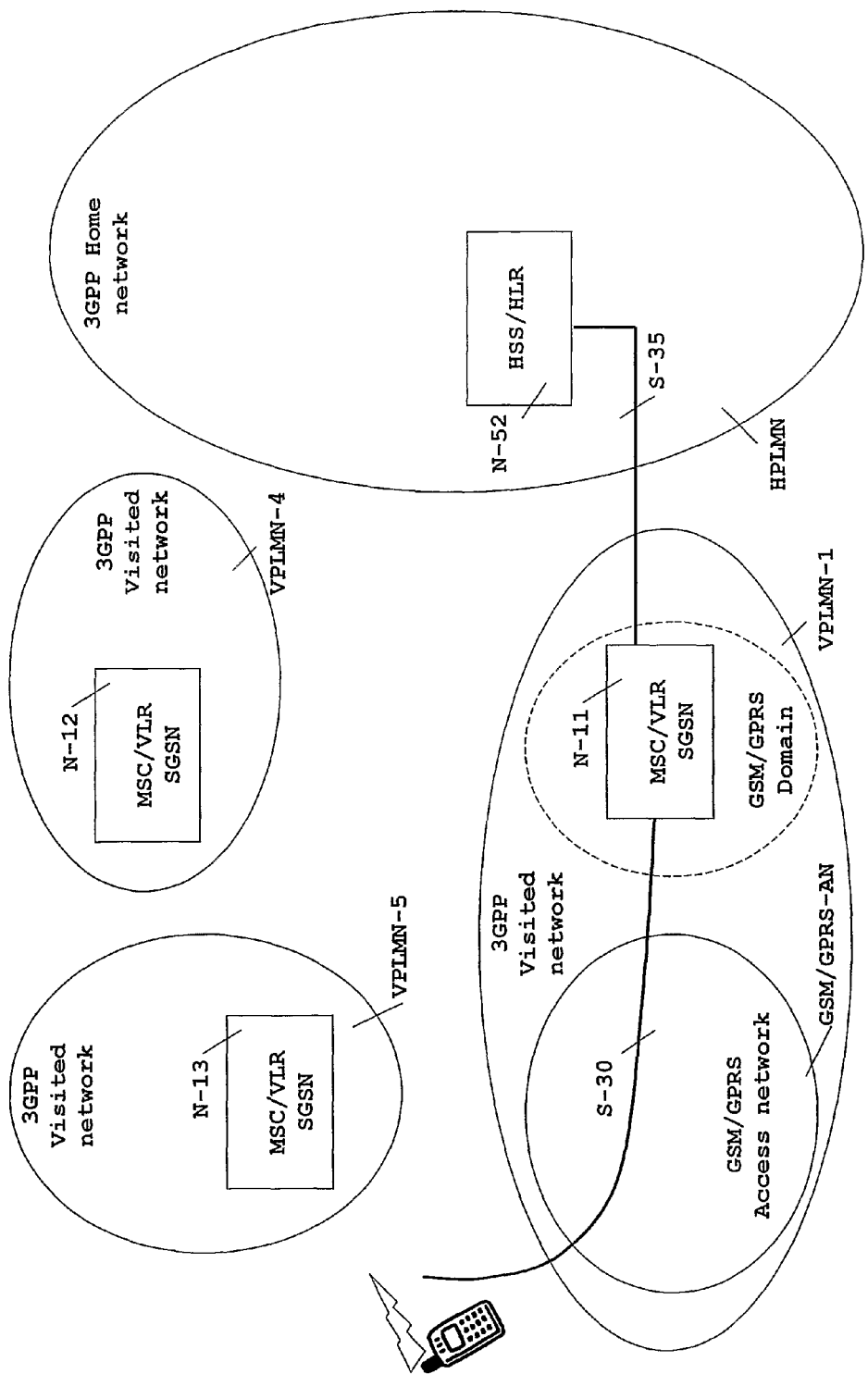
FIG.-5-

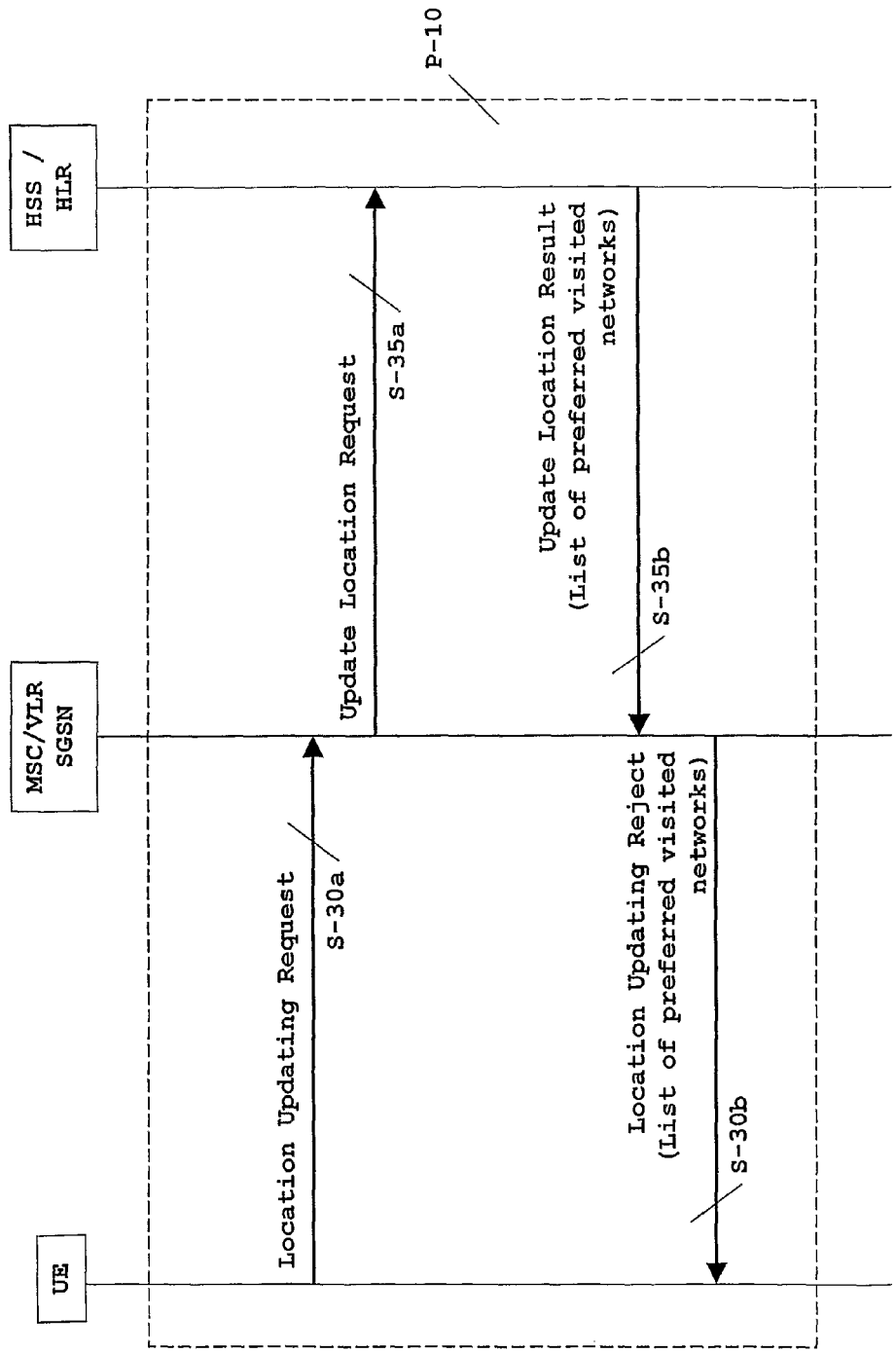
FIG.-6-

APPARATUS AND METHOD FOR SELECTING A VISITED NETWORK

CROSS-REFERENCE TO RELATED APPLICATIONS

This application is a continuation of U.S. application Ser. No. 11/916,797, filed Jul. 8, 2008, granted as U.S. Pat. No 8,155,092 B2, which was the National Stage of International Application No. PCT/EP2005/006280, filed Jun. 11, 2005, the disclosure of which is incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

NOT APPLICABLE

BACKGROUND OF THE INVENTION

The present invention generally relates to the selection of a visited network by a user or user equipment when roaming in an area where more than one visited network is accessible. In particular, the invention may be applied where the visited networks are accessible through different access networks.

At present, the 3$^{rd}$ Generation Partnership Project (generally known as "3GPP") is developing an interworking architecture to allow the interconnection of a 3GPP network with a so-called Wireless Local Area Network (generally known as "WLAN" and also as "hot spots"), wherein the WLAN acts as an access network through which an end-user may access the 3GPP network to make use of services in the 3GPP network, or to simply use the 3GPP network for authentication, authorization and accounting purposes. A 3GPP network may include a number of network nodes and interfaces from different known technologies such as the Global System Mobile (GSM) and the GSM Packet Radio System (GPRS), and from the more recent technology Universal Mobile Telecommunications System (UMTS).

The advantage of this interconnection illustrated in FIG. 1 is a win-win relationship between both parties, namely a WLAN operator and a 3GPP network operator, as well as to end-users. The 3GPP network operator may offer to the end-users a high-speed data access provided by WLAN in places where this high-speed connection may be very useful, such as airports and hotels. Thanks to this interconnection, the WLAN hot spot operator may thus attract more end-users, those who are subscribers of a 3GPP network operator and who can more easily access their 3GPP network.

On the other hand, the 3GPP network operator still keeps on the business chain and ensures an appropriate access security by still carrying out tasks delegated by the WLAN hot spot operator. These tasks, for the time being; may be authentication of the user and charging functions.

Advantageously, the authentication in a 3GPP network make possible for end-users to authenticate with the same method as they use in their 3GPP networks, that is, by means of a user subscription identity module card (a SIM card for GSM users, a USIM card for UMTS users, and hereinafter both referred to as "U-SIM"). In this way, the authentication is transparent to end-users since they do not need to learn passwords or new user identifications to be used for the WLAN access network and, on the other hand, the 3GPP network still has an accurate knowledge that the user being authenticated is actually a subscriber of its network. Besides, charging information may be reported from the WLAN hot spot to the 3GPP network, and therefore the end-user may receive a single bill independently of the access network.

An interesting aspect of this interconnection between a WLAN access network and a 3GPP network is the selection of a Public Land Mobile network (PLMN) as a visited 3GPP network when the user is roaming and wishes to access such visited PLMN (VPLMN) through an available WLAN access network. In other words, the basic issue is to let the user know how the user can reach his home PLMN (HPLMN).

Currently, a user roaming in a GSM domain or in a GPRS domain (hereinafter both indistinctly referred to as "GSM/GPRS domain") is presented with a list of visited networks where the user can attach, this information being retrieved from storage in the user's U-SIM. There is no mechanism with updated information whereby a user can apply different selection criteria for selecting a visited network (VPLMN) and, even less, dynamic selection criteria depending on most recent service agreements between the home network operator and the different visited network operators.

More precisely, when a subscriber of a home network (HPLMN) tries to register in a visited network whilst roaming, a so-called "Location Update" procedure is initiates towards the home network. In particular, the "Location Update" procedure is initiated through a so-called Mobile Switching Centre (MSC), possibly coupled with a Visitor Location Register (VLR) in a selected GSM visited network (VPLMN) towards a Home Location Register (generally known as "HLR") or a Home Subscriber Server (generally known as "HSS") in the home network; or through a Serving GPRS Server Node (SGSN) in a selected GPRS visited network (VPLMN) towards said Home Location Register (HLR) or Home Subscriber Server (HSS) in the home network, depending on whether the access network is a GSM or a GPRS access network. If the home network rejects the registration through the selected visited network, the user equipment is informed about such event and the rejected visited network, or an identifier thereof, is stored in a list of so-called "visited networks forbidden for roaming".

Any visited network included in the list of "visited networks forbidden for roaming" at the user's equipment side will not be even attempted during further registration procedures, namely "Location Update" procedures, by the user's equipment. In this respect, it would be desirable to find a mechanism whereby subscribers of a home network can be aware of the most recent service agreements between the home network and other visited networks and whereby the home network can let the user be aware of preferences for selecting an appropriate visited network depending on different selection criteria.

In a similar manner, it would be desirable to find a mechanism whereby a user roaming in a WLAN domain can select one of a plurality of visited networks (VPLMN) when connecting through a WLAN access network.

Nowadays, a user equipment adapted to operate in a WLAN access network is able to receive available Service Set Identifiers (SSID), which are identifiers of the WLAN access networks "visible" to the user equipment, but this information is not enough for selecting the most appropriate WLAN access network to reach the home network. In this context, "visible" means that the user equipment can discover and communicate with such access network via radio resources.

A current solution presented in 3GPP, and in for a of the Internet Engineering Tasks Forces (IETF), proposes the use of a special realm, "nonreachable.3gppnetwork.org", to indicate the WLAN network that the user wants to see the list of visited networks (VPLMN) that can be used to reach the user's home network (HPLMN). Upon receiving such special realm, each visible WLAN network sends back to the user a list of those visited networks (VPLMN), which the WLAN network has a direct connection to, in a format specified by "Identity selection hints for Extensible Authentication Protocol (EAP), draft-adrangi-eap-network-discovery-12. Then, and for an automatic mode, the user equipment receives a list of visited networks (VPLMN) with which each WLAN network has a direct connection. The user equipment selects one network from that list with help of two additional lists that reside in the U-SIM: a first additional list including visited networks (VPLMN) preferred by the operator, and a second additional list including visited networks (VPLMN) preferred by the user. The operator preference list is static and cannot be changed in the U-SIM, whereas the user preference list can be changed by the user at any time by operating the user's equipment. The selection of a visited network (VPLMN) from the received list with help of the two additional lists can be performed in automatic or manual mode.

An important drawback of this solution is that the user can only receive a list of visited networks (VPLMN) that the user may visit, in principle, simply because they have a direct connection to the WLAN, but the user does not have any other valuable information. Moreover, a visited network (VPLMN) selected from this list might later on be rejected by the home network (HPLMN) due to different reasons, such as the visited network being barred for roaming, or a temporary disruption of roaming services between both network operators. This implies that after having selected one WLAN access network for accessing to a certain visited network, such visited network might be rejected by the home network, so that the user would have to repeat the process until selecting an acceptable visited network (VPLMN) accessible through the selected WLAN access network, or until selecting an appropriate WLAN access network where an acceptable visited network (VPLMN) is accessible through; and this iterative process would have to be carried out with repeated accesses to the home network, for acceptance of each visited network. This drawback is even worse when the user is moving from a WLAN access network coverage area to another.

Moreover, a user usually selects a visited network (VPLMN) and wants to maintain to that visited network as long as it is reachable. This is a drawback currently in GSM/GPRS networks, where the user equipment automatically tries to switch to other visited network (VPLMN), if the signal strength of that visited network is better than the one the user had selected before, and there must be an acceptance from the home network prior to handover to the new visited network.

Therefore, an object of the present invention is the provision of a mechanism whereby a roaming user can select at least one visited network allowed for roaming by the home network operator among a plurality of visited networks (VPLMN) accessible through an access network.

Moreover, the present invention is aimed to provide users with a simple and accurate mechanism for selection of a visited network when the user is roaming and wishes to connect a WLAN access network in the way the WLAN interworking architecture currently operates.

Further, an object of the present invention is the provision to users of more complete information regarding visited networks and, access networks as selection criteria for selecting a particular access network for accessing a particular visited network.

BRIEF DESCRIPTION OF THE INVENTION

The above objects are accomplished in accordance with the present invention by the provision of a user equipment for voice and data communications of a user, a roaming server device for providing from a home network selection criteria towards the user equipment of the user for selecting a visited network when roaming, a method for selecting a visited network by the user equipment the user when roaming and, more specifically, a method for selecting a visited network accessible through visible WLAN access networks by the user equipment when the user is roaming and the user equipment is WLAN and GSM/GPRS capable.

In accordance with an aspect of the present invention, there is provided a user equipment for voice and data communications of a user, who is subscriber of a home network that includes a GSM/GPRS domain, the user equipment having:

first attaching means for selecting a first visited network to attach thereto through a GSM/GPRS access network;

means for indicating to the home network that there is support at the user equipment to apply selection criteria from the home network for selecting a visited network; and means for receiving from the home network through the GSM/GPRS access network a list of visited networks allowed for roaming, and selection criteria for selecting a visited network.

This user equipment may further comprise second attaching means for selecting a second visited network to attach thereto from those in the list of visited networks received from the home network by applying the received selection criteria. The selection criteria may include, among others, a criterion of selection priority determined by the home network, and implicitly expressed by the order in which the visited networks allowed for roaming are listed. Nevertheless, the first visited network attached to receive the list of visited network allowed for roaming may be maintained as a non-barred visited network even if not included in the received list of visited networks. This list may be intended for preferred visited networks, where the preference is given a priority, or may be intended for allowed visited networks taking into account home network agreements.

In accordance with some embodiments of the invention, such as in scenarios where the home network includes a WLAN domain and the user equipment is WLAN capable, the user equipment may include second attaching means for selecting a second visited network to attach thereto through a WLAN access network. In this user equipment, the means for indicating support to apply selection criteria from the home network comprises means for submitting, through the GSM/GPRS access network to the home network, a list of visited networks accessible through a number of indicated WLAN access networks.

Preferably, the list of visited networks received from the home network is structured on a per WLAN access network basis to show the visited networks allowed for roaming through each indicated WLAN access network. In this case, the second attaching means for selecting a second visited network may include means for attaching a WLAN access network among those in the list of visited networks per WLAN access network basis received from the home network, and by applying the received selection criteria.

Regarding the selection criteria received from the home network, the user equipment may further comprise means for passing on to the user the application of user preferences over the list of visited networks received from the home network, and means for the user to select a WLAN access network among those in the list of visited networks per WLAN access network basis. In addition, or alternatively, the user equipment may further comprise means for applying user preferences stored in the U-SIM card over the list of visited networks received from the home network.

This user equipment may advantageously include registration means for submitting towards the home network a user identity identifying the user and identifiers of the selected WLAN access network and visited network. This selection may be stored in the home network as a latest user choice that can be further used when attempting a similar scenario. Moreover, the registration means in the user equipment may also include means for submitting a selection lifetime timer value towards the home network so that said latest user choice may be cleared upon expiry of the lifetime timer.

In accordance with other aspect of the present invention, there is provided a roaming server device for providing, from a home network selection criteria for selecting a visited network towards a user equipment of a roaming user, who is subscriber of the home network where there is a GSM/GPRS domain, the roaming server device, which cooperates with the above user equipment, comprises:
  determination means for determining whether or not an indicated visited network is allowed for the roaming user to attach thereto;
  means for receiving from the user equipment indication that there is support at the user equipment to apply selection criteria from the home network for selecting a visited network; and
  means for submitting towards the user equipment a list of visited networks allowed for roaming along with selection criteria, for example priority, for selecting a visited network.

In accordance with an embodiment of the invention, the determination means in this roaming server device may include means for obtaining a list of visited networks accessible to the user on a per location basis.

Regarding the selection criteria from the home network, the roaming server device is arranged so that the selection criteria may include a criterion of selection priority explicitly expressed by a parameter value, or implicitly expressed by the order in which the visited networks allowed for roaming are listed. In this respect, the roaming server device may further include storage for a list of visited networks for each location, each visited network stored with a selection priority.

Moreover, in this roaming server device, the means for receiving indication of supporting at the user equipment selection criteria from the home network may include means for receiving a list of visited networks accessible through a number of indicated WLAN access networks. In addition, the roaming server device may further comprise:
  means for suppressing from the received list of visited networks accessible through indicated WLAN access networks those visited networks that are found to be barred for roaming; and,
  means for prioritizing the allowed visited networks on a per allowed WLAN access network basis under priorities set by the home network operator to build up a final list of visited networks allowed for roaming.

In particular, the roaming server device may be arranged so that the means for submitting towards the user equipment a list of visited networks allowed for roaming may include means for structuring said list on a per WLAN access network basis.

Aligned with corresponding features of the above user equipment, this roaming server device may further comprise:
  means for receiving from the user equipment a user identity identifying the user and identifiers of selected WLAN access network and visited network; and
  means for storing the user identity, the selected visited network and the identifier of the WLAN access network, as a latest "user's choice" list.

Additionally, the roaming server device might also include:
  means for receiving a selection lifetime timer value from the user equipment; and
  means for clearing the latest "user's choice" list upon expiry of the selection lifetime timer value.

This roaming server device may be provided as a separate entity, as further presented under some embodiments of the invention; or may be integrated into an entity of the home network, as exemplary illustrated by other embodiments.

Thus, in accordance with an aspect of the present invention, there is provided a home network entity holding a subscription for each subscriber of the home network, and comprising the above roaming server device. Such entity may be a Home Location Register or a Home Subscriber Server.

Apart from the co-operating entities, the above user equipment and roaming server device, there is provided in accordance with the invention, and commented above, a method for selecting a visited network by a user equipment of a roaming user who is subscriber of a home network that includes a GSM/GPRS domain. This method comprises the steps of:
  the user equipment attaching to a first visited network through a GSM/GPRS access network;
  indicating to the home network that there is support at the user equipment to apply selection criteria from the home network for selecting a visited network;
  receiving from the home network through the GSM/GPRS access network a list of visited networks allowed for roaming, and selection criteria for selecting a visited network; and
  the user equipment attaching to a second visited network selected from those in the list of visited networks received from the home network by applying the received selection criteria.

Apart from this method and, in accordance with other aspect of the invention, for practical use by subscribers of a home network that includes a GSM/GPRS domain and a WLAN domain, there is provided a method for selecting a visited network accessible through visible WLAN access networks, by a user's equipment that is WLAN and GSM/GPRS capable. This method comprises the steps of:
  the user equipment attaching to a first visited network through a GSM/GPRS access network; and
  collecting from the visible WLAN access networks a list of visited networks accessible through each indicated WLAN access network;
  submitting through the GSM/GPRS access network to the home network the list of visited networks accessible through each indicated WLAN access network;
  receiving from the home network through the GSM/GPRS access network a list of allowed visited networks accessible through each indicated WLAN access network; and
  the user equipment attaching to a second visited network through a WLAN access network selected from those in the list of visited networks per WLAN access network basis received from the home network.

In this method, the step of receiving a list of visited networks from the home network may include a step of receiving selection criteria for selecting one visited network from the list of visited networks. Moreover, the step of attaching to a second visited network may include a step of applying the received selection criteria to the list of visited networks per WLAN access network basis received from the home network. More precisely, the step of attaching to a second visited network in this method may include a step of applying user preferences over the list of visited networks per WLAN access network basis as received from the home network. In accordance with some embodiment of the invention, the user preferences may be applied with any list of preferred visited networks stored in the U-SIM card.

Aligned with corresponding features in the above entities, the method may further comprise, a step of registering towards the home network a user identity identifying the user, and identifiers of the selected WLAN access network and visited network to be stored as a latest "user's choice" list.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

BRIEF DESCRIPTION OF THE DRAWINGS

The features, objects and advantages of the invention will become apparent by reading this description in conjunction with the accompanying drawings, in which:

FIG. 1 is a basic block diagram illustrating a currently existing interworking architecture to access a 3GPP network through a WLAN access network FIG. 2 is a basic diagram illustrating how a user may access the home network through a GSM/GPRS access network and through a WLAN access network, both access networks in communication with an allowed visited network that includes a WLAN domain and a GSM/GPRS domain.

FIGS. 3A, 3B and 3C illustrates a basic signalling flow describing how a user's terminal equipment collects from each visible WLAN access network the list of visited networks accessible through each WLAN access network, sending these lists of visited networks per WLAN access network towards the home network, and receiving the final lists of visited networks allowed for roaming from the home network.

FIG. 4 is a basic diagram illustrating a similar scenario as shown in FIG. 2 wherein the GSM/GPRS access network is connected with a first visited network and the WLAN access network is connected with a second visited network, both visited networks allowed for roaming through the GSM/GPRS and the WLAN access network respectively; whereas a third visited network is not allowed for roaming.

FIG. 5 is a basic diagram illustrating how a user may access the home network through one amongst a plurality of visible GSM/GPRS access networks to receive a list of allowed access networks with applicable selection criteria from the home network.

FIG. 6 is a basic signalling flow describing an Update Location procedure included within the attachment of a users equipment with the network where the user is a subscriber.

DETAILED DESCRIPTION OF THE INVENTION

The following describes some preferred embodiments for providing a mechanism to allow a roaming user the selection of a visited network allowed for roaming by the home network operator, the visited network being accessible through a visible access network.

An important aspect behind the present invention is that a home network (HPLMN) must be arranged, to determine whether a given visited network (VPLMN) is allowed or not for roaming at the time the determination is made. Therefore, an entity in the home network may be provided with a white list including only those visited networks allowed for roaming (VPLMN, VPLMN-1, VPLMN-2), or with a black list including only those visited networks barred for roaming (VPLMN-3), or with combinations thereof.

In particular, the determination may also result in further roaming data that may be used by the user to select a visited network based on a number of selection criteria. For example, different tariffs applying to calls made when roaming in each visited network, or other offers from each allowed visited network, or operator preferences from the home network operator based on particular agreements with the different visited networks. Therefore, the lists of allowed and/or barred visited networks, as well as all the additional roaming data needed for building up a number of selection criteria, may be handled by a dedicated device (N-53), which in the instant specification is called "Roaming Server Device", and may be modified at any time by the operator of the home network (HPLMN) using operation and maintenance facilities, for example.

This roaming server device (N-53) may be provided as a separate entity as shown in FIG. 2-4, or may be integrated into an entity (N-52) of the home network (HPLMN) as exemplary illustrated in FIG. 5, such as in a Home Location Register (generally known as "HLR") or in a Home Subscriber Server (generally known as "HSS").

In accordance with a first aspect of the present invention illustrated mainly in FIG. 5 and FIG. 6 with references also in FIG. 3A, wherein a user makes use of a user's equipment (UE) that is GSM/GPRS capable in a scenario with several GSM/GPRS access networks visible to the user equipment, there is provided a mechanism arranged to indicate the user equipment (UE) those potential visited networks (VPLMN-1, VPLMN-4, VPLMN-5) that are available at the current location, and the priority that may be considered for registration through each particular visited network. In addition, the mechanism may be configured to force a desired order of registration in case of visited networks or user equipment not being adapted to support the proposed mechanism. Therefore, as illustrated in FIG. 5, FIG. 6 and FIG. 3A, when a subscriber tries to register in the network during a so-called attachment procedure (P-10) with a user equipment (UE) through an MSCNLR (N-11) of a visited GSM network (VPLMN-1), or through an SGSN (N-11) of a visited GPRS network, a Location Update procedure is started (S-30a, S-35a) towards the HLR/HSS (N-52) holding the subscriber's subscription for such subscriber with user equipment (UE) in the home PLMN (HPLMN).

The HLR/HSS has storage to store a list of visited networks (VPLMN-1, VPLMN-2, VPLMN-3, VPLMN-4, VPLMN-5) potentially available at different locations for each subscriber, subscriber group, or all subscribers of the home network. Preferably, each visited network is qualified with a priority value (Pri) that may be used as selection criteria. In another embodiment, the priority of the visited networks potentially available in the specific location may as well be determined by considering a priority implicitly derived from the order in which a visited network appears in the list. Regarding the location of a user, in accordance with one embodiment of the invention, a Country Code (MCC) and a National Destination Code (MNDC) may be used to determine the location where the user is roaming, as shown in the following exemplary Table I:

TABLE I

| Location | visited networks + priority |
|---|---|
| MCC-1 | VPLMN-1, Pri:1; VPLMN-2, Pri:2 |
| MCC-2, MNDC-1 | VPLMN-3, Pri:1; VPLMN-4, Pri:2; VPLMN-5, Pri:3; |
| MCC-2, MNDC-2 | VPLMN-3, Pri:2; VPLMN-4, Pri:1; |

In accordance with an embodiment of the invention, when a subscriber tries to register in a MSCNLR (N-10, N-11) or in SGSN (N-10, N-11) the Location Update procedure is initiated towards an HLR/HSS (N-52) of the home network (HPLMN), including the identification of the visited network (VPLMN-1), where the subscriber attempts the registration, in terms of the Country Code (MCC) and National Destination Code (MNDC) of such visited network. The HLR/HSS, or the roaming server device (N-53) as the implementation may be, makes use of the user identification, for example the International Mobile Subscriber Identity (IMSI) and the visited network identification (MCC-1) to select the list of preferred visited networks (VPLMN-1, Pri:1; VPLMN-Z Pri:2) applicable to the subscriber.

The Location Update procedure, within the embodiment of FIG. 5 and FIG. 6, may include an indication set by the user equipment (UE) to let the home network know that there is support at the user equipment (UE) to apply selection criteria from the home network for selecting a visited network. Provided that this indication is not included, the HLR/HSS assumes that either the visited network currently in use, or the user equipment do not support this functionality, and the process may be configured to continue according to the traditional mechanism or to force a desired order of registration. The latter configuration prevents the HLR/HSS from sending the list of preferred visited networks by rejecting the location updating with an appropriate return code, such as a "Network Failure" already existing under other procedures, to force the re-attempt of location updating with available criteria at the user equipment.

However, provided that the user equipment (UE) has included the indication of supporting selection criteria from the home network, the HLR/HSS (N-52) answers (S-35b, S-30b) towards the user equipment (UE), within the Location Update procedure, with the list of visited networks allowed for roaming and with an implicitly or explicitly given priority value (Pri) as selection criteria for each visited network.

In case the initially selected visited network (VPLMN-1), where the user has triggered the "Location Update" procedure through, is not a preferred one from the home network (HPLMN) perspective, the location updating is not accepted and an unsuccessful result may, be returned to the user equipment (UE) indicating a new cause "PLMN not preferred" and, additionally, the list of the preferred visited networks with indication of priorities as selection criteria to be further used. Preferably, said unsuccessful result may be a sort of Reject message. This list is delivered to the user equipment (UE) that may store it as a home network preference list to be considered in further attempts. When this situation occurs, the initially selected visited network (VPLMN-1) is maintained as a non-barred visited network even if it is not a preferred one in the home network preference list. Nevertheless, this preference of the home network operator might be skipped if the user preferences prevail under the home network operator premises.

If the network rejects the Location Update procedure (P-10) with the new error "PLMN not preferred", the user equipment (UE) re-attempts with those preferred visited networks according to the priorities indicated in the list of preferred visited networks. In these cases, the HLR/HSS may mark that the subscriber has been informed about the list of preferred visited networks after a registration attempt on a non-preferred visited network. This mark may be cleared after a configurable time period. Whilst this mark is set, further registration attempts may be accepted independently of their priority, and assuming that the user equipment (UE) is trying to register with the available visited networks according to the information provided from the home network. This mark is cleared after a successful registration.

This solution presented in the above embodiments, whereby the home network submits a list of preferred visited networks, or allowed visited networks, along with selection criteria towards the user equipment for the latter to select the most appropriate visited network under said selection criteria, may as well be applied to other scenarios presenting a similar drawback and where the solution may be completed with further features though following similar principles.

For instance, in embodiments of the present invention illustrated in FIG. 2 and FIG. 4, a user makes use of a user's equipment (UE) that is WLAN and GSM/GPRS capable. This scenario is currently feasible as there exist, for example, Personal Digital Assistants (PDAs) with both capabilities, also known as 'Handheld Computers', 'Palm Pilots', and others, or it can be achieved by using a WLAN capable terminal, such as a laptop, that communicates with a GSM/GPRS capable user equipment, such as a mobile phone, using some physical link, for example an USB cable, or using an air link, such as Bluetooth.

Generally speaking, the embodiments illustrated in FIG. 2 and FIG. 4 show only one WLAN access network (WLAN-AN) though there may be more than one visible WLAN access networks at the same time to the user equipment (UE). The WLAN access network allows the user to access a visited network (VPLMN, VPLMN-2) connected with said WLAN access network.

In particular, FIG. 2 illustrates a first embodiment where the visited network (VPLMN) hosting the WLAN domain is the same as the visited network hosting the GSM/GPRS domain, whereas FIG. 4 illustrates a second embodiment where the visited network (VPLMN-2) hosting the WLAN domain is different from the visited network (VPLMN-1) hosting the GSM/GPRS domain. This difference between the first and second embodiment may be of low relevance if the home network (HPLMN) handles each access network independently and does not perform any correlation between the visited networks accessed through each different access network. However, advantages may be obtained from the first embodiment illustrated in FIG. 2 where the home network prioritize the selection of a visited network (VPLMN) accessed through the GSM/GPRS access network as the visited network to be selected through the WLAN access network, this prioritization achieved with selection criteria submitted from the home network towards the user equipment.

On the other hand, the embodiments illustrated in FIG. 2 and FIG. 4 may be better explained with reference to the sequence flow presented in FIGS. 3A, 3B and 3C, where additional features may be described harmonizing between different network entities, and where additional advantages may be obtained depending on the network configuration and on the particular wishes that a network operator might have.

The sequence of actions shown in FIG. 3A starts with a first, step whereby a user (UE) enters the coverage area of a GSM/GPRS access network (GSM/GPRS-AN), which includes antennas and base stations infrastructure, and the user equipment (UE) carries out a GSM/GPRS attachment procedure (P-10), which includes a 'Location Update' procedure, through entities (N-10, N-11) in the visited network (VPLMN, VPLMN-1) owning the GSM/GPRS access network, and towards entities (N-52) in the user's home network (HPLMN).

Then, the user moves to an area where the user equipment (UE) detects that there are one or more WLAN access networks (WLAN-AN) available and, as part of the so-called IEEE Association procedures (P-20), the user equipment (UE) receives an WLAN access network identifier (SSID) for each visible WLAN access network in the coverage area of the user equipment (UE). In addition, the user equipment (UE) receives (S-10, S-11) a list of visited networks (VPLMN, VPLMN-2, VPLMN-3) from each WLAN access network, visited networks that the WLAN access network has a direct connection thereto. Each list of visited networks is maintained by a so-called Local "Authentication, Authorisation and Accounting" (generally abbreviated as "AAA") server (Local AAA) in each WLAN access network. That is, there is an iteration process (P-30) where the user equipment receives from each WLAN access network, its WLAN access network identifier and a list of visited networks connectable through such WLAN access network.

At the end of these steps, and under the most flexible embodiment illustrated in FIG. 4 as compared to the one in FIG. 2, the user equipment (UE) might have collected information according to the following exemplary Table II:

TABLE II

| WLAN identifier | connectable visited networks |
| --- | --- |
| SSID-1 | VPLMN-1, VPLMN-2 |
| SSID-2 | VPLMN-2, VPLMN-3 |
| SSID-3 | VPLMN |

Once this information has been collected from the visible WLAN access networks (WLAN-AN), the user equipment (UE) may send (S-12, S-13, S-14), for each visible WLAN access network, a WLAN access network identifier (SSID) and the list of visited networks accessible to each WLAN access network (VPLMN-1, VPLMN-2; SSID-1) (VPLMN-2, VPLMN-3; SSID-2) (VPLMN; SSID-3) towards an entity in the home network (HPLMN) through the GSM/GPRS network (GSM/GPRS-AN, VPLMN-1) where the user equipment (UE) had previously attached. Therefore, different mechanisms can be used for the transmission of these data.

A first exemplary mechanism that can be used for both embodiments illustrated in FIG. 2 and FIG. 4 may be the use of Short Message Services (SMS) whereby a short message is sent (S-12) from the user equipment, received at an entity (N-10, N-11) in charge of the GSM/GPRS domain in the visited network, and forwarded from there (S-13) towards a so-called SMS Service Centre (generally abbreviated as SMS-SC) (N-51) in the home network. This first mechanism, which is valid for both embodiments in FIG. 2 and FIG. 4, is valid in particular for a GSM access and visited network, as well as for a GPRS access and visited network. More specifically, a Mobile Switching Centre (MSC), possibly coupled with a Visitor Location Register (VLR), is the entity (N-10, N-11) receiving the short message in a GSM visited network (VPLMN, VPLMN-1) and forwarding it to the SMS Service Centre (N-51), whereas a Serving GPRS Server Node (SGSN) is the entity (N-10, N-11) receiving the short message in a GPRS visited network (VPLMN, VPLMN-1) and forwarding it to the SMS Service Centre (N-51).

A second exemplary mechanism that can be used for both embodiments illustrated in FIG. 2 and FIG. 4 may be the use of Hyper Text Transfer Protocol (generally abbreviated as "HTTP") over a GPRS access and visited network. A still third exemplary mechanism that can be used for both embodiments in FIG. 2 and FIG. 4 may be the use of an Unstructured Subscriber Data message (generally abbreviated as "USSD") over a GSM access and visited network.

In accordance with another aspect of the present invention already explained above, the roaming server device (N-53) may be the entity eventually receiving (S-14) in the home network (HPLMN) the list, of connectable visited networks (VPLMN, VPLMN-2) and the WLAN access network identifier (SSID) for each visible WLAN access network (WLAN-AN). In this respect, the roaming server device (N-53) may receive (S-14) such information from the SMS Service Centre (N-51) where the information is submitted by the user equipment (UE) in a short message, or directly from the entity (N-10, N-11) forwarding such information (S-13bis) from the visited network (VPLMN, VPLMN-1) where the information is submitted by the user equipment (UE) via HTTP or USSD.

Regarding the arrangement in the home network (HPLMN) to determine whether a given visited network (VPLMN, VPLMN-1, VPLMN-2, VPLMN-3) is allowed or not for roaming, different embodiments may be provided to this end. In a first of these embodiments, as the one shown in FIG. 5, the roaming server device (N-53) is an integral part of a home entity (N-52) in charge of handling subscriber data in the home network (HPLMN) such as a Home Location Register (HLR) or Home Subscribers Server (HSS) may be. In this case, the list of allowed visited networks and/or the list of barred visited networks may reside in the home entity (N-52), which carries out the determination on whether a given visited network (VPLMN, VPLMN-1, VPLMN-2, VPLMN-3) is allowed or not.

In a second of these embodiments, the roaming server device (N-53) is a separate device that is connectable to an SMS Service Centre (N-51) for receiving roaming information, namely the list of connectable visited networks (VPLMN, VPLMN-2) and the WLAN access network identifier (SSID) for each visible WLAN access network (WLAN-AN), via a short message; connectable to a Serving GPRS Server Node (SGSN) (N-10, N-11) for receiving the roaming information via HTTP; connectable to a Mobile Switching Centre (MSC) (N-10, N-11) for receiving the roaming information via USSD; and connectable to the home entity (N-52) in charge of handling subscriber data in the home network (HPLMN), such as a Home Location Register (HLR) or Home Subscribers Server (HSS), for receiving upon request a list of allowed visited networks for a given user.

In a third of these embodiments, the roaming server device (N-53) is a configurable device that can be configured to operate as an integral part of a home entity (N-52), thus not requiring an external connection for receiving the list of allowed visited networks for a given user; or configured to operate as a separate entity, where either an external connection to the home entity (N-52) is used for receiving the list of allowed visited networks for a given user, or the roaming server owns said list of allowed visited networks for all the users; and that can be configured to be connected to at least one of the following entities: an SMS Service Centre (N-51), a Serving GPRS Server Node (SGSN) (N-10, N-11), and a Mobile Switching Centre (MSC) (N-10, N-11).

The sequence shown in FIG. 3A addresses the second of these embodiments where the roaming server device (N-53) is a separate device provided with an external connection to the home entity (N-52). At this stage, the roaming server device (N-53) may request (S-15) the home entity (N-52) to send (S-16) the list of allowed visited networks (VPLMN, VPLMN-1, VPLMN-2) for an indicated user. Assuming this home entity (N-52) is an HLR/HSS, the external connection between the home entity (N-52) and the roaming server device (N-53) can be carried out over a so-called "Sh" interface, described in 3GPP TS 29.328, and that is intended for communication between HLR/HSS and application servers, the roaming server device being thus regarded as an application server.

Once the roaming server device (N-53) has the list of allowed visited networks (VPLMN, VPLMN-1, VPLMN-2) for the indicated user, the roaming server device analyzes every list received from the user equipment (UE), which were collected from Local AAA servers (N-30) at the visible WLAN access network (WLAN-AN), to determine whether or not the visited networks (VPLMN, VPLMN-1, VPLMN-2, VPLMN-3) accessible through indicated WLAN access networks are allowed for roaming.

Therefore, a sequence of actions as illustrated in FIG. 3B may be carried out, wherein the roaming server device (N-53) may perform on each one of the lists received from the user equipment any of the following actions (P-40):

suppressing from all the lists received from the user equipment (UE) those visited networks (VPLMN-3) that are found to be barred for roaming;

if a given WLAN access network (WLAN-AN) has a direct connection to the home network (HPLMN), the home network is placed in the first position of a resulting list (hereinafter called "user's choice" list), for the given WLAN access network, with an special mark to highlight that it is the home network of the user;

prioritizing the user's choice list, by placing in the first places those visited networks with highest priority; or by including a priority value for each visited network, as already explained in a previous embodiment for an aspect of the present invention;

prioritizing the user's choice list on a per allowed. WLAN access network basis; and prioritizing the user's choice list in any other order that can be configured by the user or the operator, for example, prices and other offers.

The thus built up user's choice list is submitted (S-17, S-18, S-19) from the home network (HPLMN, N-52, N-53) towards the user equipment (UE). In accordance with an embodiment of the invention, the user's choice list is submitted (S-17) with a short message to be received at the SMS Service Centre (N-51) of the home network, and further forwarded (S-18, S-19) towards the user equipment (UE) through an entity (N-10, N-11) in the visited network in charge of the GSM/GPRS domain. As for the reception of the original list from the user equipment, the submission of the user's choice list towards the user equipment may be carried out with HTTP over a GPRS access and visited network, or with USSD over a GSM access and visited network.

Upon reception of the user's choice list at the user equipment from the home network (HPLMN), the user equipment (UE) may apply further preferences over the user's choice list on its own, with any list of preferred visited networks stored in the U-SIM card (P-50), if configured on automatic mode; or may pass on the application of further preferences to the user (P-60), if the user equipment is configured on manual mode.

For example, if VPLMN-3 was found to be barred for roaming by the home network, and VPLMN-1 was found, to be not allowed for roaming by the home network when accessed through a WLAN access network, the User's choice list received at the user equipment would include information according to the following exemplary Table III:

TABLE III

| WLAN identifier | Allowed visited networks |
| --- | --- |
| SSID-1 | —, VPLMN-2 |
| SSID-2 | VPLMN-2, — |
| SSID-3 | VPLMN |

The user equipment (UE) when configured in automatic mode, or the user when configured in manual mode, may carry out a further selection over the user's choice list received from the home network (HPLMN) taking into account other information received on a per visited network basis, namely the selection criteria that might have been received from the home network, such as price or priorities for selection, any other information stored in the U-SIM card, and other information on personal premises.

Once the selection is made either by the user equipment and/or the user, if the user's choice list from the home network so allows, or by the network when the user's choice list offers non-negotiable priorities from the home network for selection, the user equipment attaches (P-70) to the selected WLAN access network. Therefore, as FIG. 3C illustrates, the user equipment comprises registration means for submitting (S-20, S-21) the user identity (User-ID) as well the selected visited network (VPLMN, VPLMN-2) towards a Local-AAA (N-30) through an Access Point (AP), which is not depicted in FIG. 2 and FIG. 4 for simplicity reasons, both in the WLAN access network. Then, the Local AAA (N-30) registers (S-22) the user into an AAA Proxy (N-20, N-22)) of the selected visited network (VPLMN, VPLMN-2) and the AAA Proxy submits the user identity and an identifier of the selected visited network to an MA Server (N-54) in the home network and in charge of triggering the authentication of the user (P-80). Then, an authentication of the user is carried out (P-90) with participation of the user equipment (UE), the AAA Server (N-54), and the HLR/HSS (N-52) as such with or without including the roaming server device (N-53).

Regarding this sequence of actions illustrated in FIG. 3C, the user equipment may submit (S-20, S-21) towards a Local-AAA (N-30), apart from the user identity (User-ID) and the selected visited network (VPLMN, VPLMN-2), the identifier (SSID) of the WLAN access network. This identifier (SSID) may be included along with the user identity (User-ID) and the selected visited network (VPLMN; VPLMN-2) in the previously explained submission (S-22) from the Local AAA (N-30), through the AAA Proxy (N-20, N-22) in the visited network, until reaching (S-23) the AAA server (N-54) in the home network.

Then, under this particular embodiment where the user identity (User-ID), the selected visited network (VPLMN, VPLMN-2), and the identifier (SSID) of the WLAN access network are received in the home network (N-54) and once the authentication process is completed as explained above, the AAA server (N-54) in the home network may submit (S-24) towards the roaming server device (N-53) the user identity (User-ID), the selected visited network (VPLMN, VPLMN-2), and the identifier (SSID) of the WLAN access network to be stored in the roaming server device (N-53), or in the HLR/HSS (N-52) as the implementation case might be, for further use as a latest user's choice list. Thanks to the storage of user identity (User-ID), selected visited network (VPLMN, VPLMN-2), and identifier (SSID) of the WLAN access network, further selections of allowed or preferred visited networks from the home network are advantageously simplified.

In this respect, and as a further advantage, the user equipment might set as well a selection lifetime timer value that, in accordance with a further embodiment not illustrated in any drawing, may be submitted (S-20, S-21, S-22, S-23, S-24) along with the user identity (User-ID), the selected visited network (VPLMN, VPLMN-2), and the identifier (SSID) of the WLAN access network from the user equipment towards the roaming server device (N-53) so that a lately stored user's choice list may be cleared upon the expiry of said selection lifetime time.

The invention is described above in respect of several embodiments in an illustrative and non-restrictive manner. Obviously, variations, and combinations of these embodiments are possible in light of the above teachings, and any modification of the embodiments that fall within the scope of the claims is intended to be included therein.

What is claimed:

1. A user equipment for voice and data communications of a user, who is subscriber of a home network that includes a GSM/GPRS domain, the user equipment having:
   first attaching means for selecting a first visited network to attach thereto through a GSM/GPRS access network;
   means for collecting from visible WLAN access networks a list of visited networks accessible through each visible WLAN access network;
   means for submitting through the GSM/GPRS access network to the home network a list of visited networks accessible through each indicated WLAN access network;
   means for receiving from the home network through the GSM/GPRS access network a list of allowed visited networks accessible through each indicated WLAN access network, as selection criteria for selecting a visited network; and
   second attaching means for attaching to a second visited network through a WLAN access network selected from those in the list of visited networks per WLAN access network basis received from the home network.

2. The user equipment of claim 1, wherein the second attaching means is further arranged for selecting the second visited network to attach thereto from those in the list of allowed visited networks received from the home network by applying the received selection criteria.

3. The user equipment of claim 2, wherein the selection criteria for selecting a visited network, as received from the home network through the GSM/GPRS access network, are implicitly expressed by the order in which the visited networks allowed for roaming are listed.

4. The user equipment of claim 2, wherein the means for receiving the list of allowed visited networks from the home network through the GSM/GPRS access network, as the selection criteria for selecting a visited network, includes means for receiving a criterion of selection priority explicitly expressed by a parameter value.

5. The user equipment of claim 1, wherein the first visited network attached to receive the list of visited network allowed for roaming is maintained as a non-barred visited network.

6. The user equipment of claim 1, wherein the list of allowed visited networks received from the home network is structured on a per WLAN access network basis to show the visited networks allowed for roaming through each indicated WLAN access network.

7. The user equipment of claim 6, further comprising:
   means for passing on to the user application of user preferences over the list of allowed visited networks received from the home network, and
   means for the user to select a WLAN access network among those in the list of allowed visited networks per WLAN access network basis.

8. The user equipment of claim 1, further comprising means for applying user preferences over the list of allowed visited networks received from the home network, the user preferences applied with any list of preferred visited networks stored in the U-SIM card.

9. The user equipment of claim 1, further comprising registration means for submitting towards the home network a user identity identifying the user and identifiers of the selected WLAN access network and visited network.

10. The user equipment of claim 9, wherein the registration means is further arranged for submitting a selection lifetime timer value towards the home network.

11. A roaming server device for providing from a home network selection criteria for selecting a visited network towards a user equipment of a roaming user who is subscriber of the home network, the home network including a GSM/GPRS domain, the roaming server device comprising:
   means for receiving through a GSM/GPRS access network a list of visited networks accessible through each indicated WLAN access network;
   determination means for determining whether or not each visited network in the list is allowed for the roaming user to attach thereto; and
   means for submitting towards the user equipment through the GSM/GPRS access network a list of allowed visited networks accessible through each indicated WLAN access network, as selection criteria for selecting a visited network.

12. The roaming server device of claim 11, wherein the means for submitting the list of allowed visited networks, as the selection criteria for selecting a visited network, includes means for submitting a criterion of selection priority explicitly expressed by a parameter value.

13. The roaming server device of claim 12, wherein the selection criteria for selecting a visited network, as submitted towards the user equipment through the GSM/GPRS access network, are implicitly expressed by the order in which the visited networks allowed for roaming are listed.

14. The roaming server device of claim 13, further including storage for a list of visited networks for each location, each visited network stored with a selection priority.

15. The roaming server device of claim 11, further comprising:
   means for suppressing from the received list of visited networks accessible through each indicated WLAN access network those visited networks that are found to be barred for roaming; and
   means for prioritizing the allowed visited networks on a per allowed WLAN access network basis under priorities set by the home network operator to build up a final list of allowed visited networks for roaming.

16. The roaming server device of claim 15, further comprising:
   means for receiving from the user equipment a user identity identifying the user and identifiers of selected WLAN access network and visited network; and means for storing the user identity, the identifier of the selected visited network and the identifier of the selected WLAN access network, as a latest user's choice list.

17. The roaming server device of claim 16, further comprising:
   means for receiving a selection lifetime timer value from the user equipment; and
   means for clearing the latest user's choice list upon expiry of the selection lifetime timer value.

18. The roaming server device of claim 11, wherein the determination means is further arranged for obtaining a list of visited networks accessible to the user on a per location basis.

19. A home network entity holding a subscription for each subscriber of the home network, comprising:
   means for receiving through a GSM/GPRS access network a list of visited networks accessible through each indicated WLAN access network;
   determination means for determining whether or not each visited network in the list is allowed for the roaming user to attach thereto; and
   means for submitting towards the user equipment through the GSM/GPRS access network a list of allowed visited networks accessible through each indicated WLAN access network, as selection criteria for selecting a visited network.

20. A method for selecting a visited network accessible through visible WLAN access networks by a user equipment of a roaming user who is subscriber of a home network that includes a GSM/GPRS domain, the user equipment being WLAN and GSM/GPRS capable, the method comprising the steps of:
   the user equipment attaching to a first visited network through a GSM/GPRS access network;
   the user equipment collecting from visible WLAN access networks a list of visited networks accessible through each visible WLAN access network;
   the user equipment submitting through the GSM/GPRS access network to the home network the list of visited networks accessible through each indicated WLAN access network;
   receiving at the user equipment from the home network through the GSM/GPRS access network a list of allowed visited networks accessible through each indicated WLAN access network, as selection criteria for selecting a visited network; and
   the user equipment attaching to a second visited network through a WLAN access network selected from those in the list of allowed visited networks per WLAN access network basis received from the home network.

21. The method of claim 20, wherein the step of attaching to a second visited network includes a step of applying the received selection criteria to the list of allowed visited networks per WLAN access network basis received from the home network.

22. The method of claim 21, wherein the step of attaching to a second visited network includes a step of applying user preferences over the list of allowed visited networks per WLAN access network basis received from the home network, the user preferences applied with any list of preferred visited networks stored in the U-SIM card.

23. The method of claim 21, further comprising a step of registering towards the home network a user identity identifying the user and identifiers of the selected WLAN access network and visited network to be stored as a latest user's choice list.

24. The method of claim 21, wherein the step of receiving the list of allowed visited networks, as the selection criteria for selecting a visited network, includes a step of receiving a criterion of selection priority explicitly expressed by a parameter value.

25. The method of claim 24, wherein the selection criteria for selecting a visited network, as received from the home network through the GSM/GPRS access network, are implicitly expressed by the order in which the visited networks allowed for roaming are listed.

* * * * *

UNITED STATES PATENT AND TRADEMARK OFFICE
CERTIFICATE OF CORRECTION

PATENT NO. : 8,879,529 B2
APPLICATION NO. : 13/401415
DATED : November 4, 2014
INVENTOR(S) : Mariblanca Nieves et al.

Page 1 of 2

It is certified that error appears in the above-identified patent and that said Letters Patent is hereby corrected as shown below:

In the Specification

In Column 1, Line 58, delete "being;" and insert -- being, --, therefor.

In Column 3, Line 41, delete "network," and insert -- network --, therefor.

In Column 3, Line 65, delete "and, access" and insert -- and access --, therefor.

In Column 5, Line 18, delete "providing, from" and insert -- providing from --, therefor.

In Column 7, Line 12, delete "comprise, a" and insert -- comprise a --, therefor.

In Column 7, Line 31, delete "network" and insert -- network. --, therefor.

In Column 7, Line 37, delete "illustrates" and insert -- illustrate --, therefor.

In Column 7, Line 58, delete "users" and insert -- user's --, therefor.

In Column 8, Line 2, delete "arranged, to" and insert -- arranged to --, therefor.

In Column 8, Line 47, delete "MSCNLR" and insert -- MSC/VLR --, therefor.

In Column 9, Line 10, delete "MSCNLR" and insert -- MSC/VLR --, therefor.

In Column 9, Line 21, delete "VPLMN-Z" and insert -- VPLMN-2, --, therefor.

In Column 9, Line 51, delete "may, be" and insert -- may be --, therefor.

In Column 10, Line 64, delete "first, step" and insert -- first step --, therefor.

In Column 12, Line 12, delete "list, of" and insert -- list of --, therefor.

In Column 13, Line 38, delete "priority;" and insert -- priority, --, therefor.

Signed and Sealed this
Thirtieth Day of June, 2015

Michelle K. Lee
*Director of the United States Patent and Trademark Office*

CERTIFICATE OF CORRECTION (continued)
U.S. Pat. No. 8,879,529 B2

In Column 14, Line 2, delete "found," and insert -- found --, therefor.

In Column 14, Line 4, delete "User's" and insert -- user's --, therefor.

In Column 14, Line 37, delete "N-22))" and insert -- N-22) --, therefor.

In Column 14, Line 40, delete "MA server" and insert -- AAA server --, therefor.

In Column 14, Line 52, delete "(VPLMN;" and insert -- (VPLMN, --, therefor.